United States Patent
McLaren et al.

(10) Patent No.: US 6,988,757 B2
(45) Date of Patent: Jan. 24, 2006

(54) COMPOSITE PANEL AND METHOD OF FORMING THE SAME

(75) Inventors: John W. McLaren, Cheboygan, MI (US); George A. Klumb, Novi, MI (US); Mark P. Allen, Bruce Township, MI (US); Allan James, Camlachie (CA)

(73) Assignee: Dow Global Technologies Inc., Midland, MI (US)

( * ) Notice: Subject to any disclaimer, the term of this patent is extended or adjusted under 35 U.S.C. 154(b) by 49 days.

(21) Appl. No.: 10/443,214

(22) Filed: May 22, 2003

(65) Prior Publication Data

US 2004/0041429 A1 Mar. 4, 2004

Related U.S. Application Data

(60) Provisional application No. 60/406,652, filed on Aug. 28, 2002.

(51) Int. Cl.
*B62D 33/03* (2006.01)

(52) U.S. Cl. ............... 296/57.1; 296/50; 296/146.8; 296/901.01

(58) Field of Classification Search .......... 296/60, 296/57.1, 146.8, 155, 901.01, 76, 50; 49/501; 428/313.5, 317.1, 317.9, 316.6
See application file for complete search history.

(56) References Cited

U.S. PATENT DOCUMENTS

| | | | | |
|---|---|---|---|---|
| 4,707,016 A | * | 11/1987 | McDonald | ............... 296/39.2 |
| 4,822,098 A | * | 4/1989 | Vogt et al. | ............... 396/76 |
| 5,272,195 A | * | 12/1993 | Hagenson et al. | ............... 524/188 |
| 5,658,408 A | | 8/1997 | Frantz et al. | |
| 5,846,377 A | | 12/1998 | Frantz et al. | |
| 5,855,706 A | | 1/1999 | Grewell | |
| 5,985,457 A | | 11/1999 | Clifford | |
| 6,161,363 A | * | 12/2000 | Herbst | ............... 49/501 |
| 6,197,403 B1 | | 3/2001 | Brown et al. | |
| 6,199,930 B1 | * | 3/2001 | Riley | ............... 296/37.6 |
| 6,241,307 B1 | | 6/2001 | Kim | |
| 6,419,774 B1 | | 7/2002 | Clifford | |
| 6,431,630 B1 | * | 8/2002 | Meinke | ............... 296/50 |
| 6,460,915 B1 | * | 10/2002 | Bedi et al. | ............... 296/183.1 |
| 6,806,330 B1 | | 10/2004 | Sonnenschein et al. | |
| 2002/0112444 A1 | * | 8/2002 | Lacasse | ............... 52/784.13 |
| 2003/0003828 A1 | * | 1/2003 | Ellison et al. | ............... 442/268 |
| 2003/0110705 A1 | * | 6/2003 | Hlavach et al. | ............... 49/501 |
| 2003/0213544 A1 | * | 11/2003 | Hesch | ............... 442/370 |

FOREIGN PATENT DOCUMENTS

| | | |
|---|---|---|
| GB | 1400018 | 7/1975 |
| GB | 2078628 | 1/1982 |
| WO | WO 99/52703 | 10/1999 |
| WO | WO 01/02166 | 1/2001 |
| WO | WO 01/44311 | 6/2001 |

OTHER PUBLICATIONS

International Preliminary Examination Report dated Oct. 28, 2004 for Application No. PCT/US03/24266.
International Search Report dated Feb. 2, 2004 (PCT/US03/24266).
"Materials for Lightweight Tailgates", aei, May 2002, pp. 113–116.

* cited by examiner

*Primary Examiner*—Lori L. Coletta
(74) *Attorney, Agent, or Firm*—Dobrusin & Thennisch PC

(57) ABSTRACT

There is disclosed a closure panel. The panel finds particular utility as a liftgate or endgate for automotive vehicles. Typically, the assembly includes a first panel portion opposite a second panel portion and an intermediate material therebetween. Preferably, one or more of the panel portions is formed of a polymeric material and the intermediate material is preferably a structural foam that can bond to both the first and the second panel portions.

37 Claims, 2 Drawing Sheets

COMPOSITE PANEL AND METHOD OF FORMING THE SAME

CLAIM OF BENEFIT OF FILING DATE

The present application claims the benefit of the filing date of U.S. Provisional Application Ser. No. 60/406,652, filed Aug. 28, 2002, hereby incorporated by reference.

TECHNICAL FIELD

The present invention relates to a composite panel and a method of forming the same. More particularly, the present invention relates to an improved closure panel (e.g., a liftgate or endgate) for an automotive vehicle such as a pick-up truck.

BACKGROUND

The automotive industry has, for many years, sought to design improved panels (e.g. floor pans) and, more particularly, closure panels such as hoods, doors, decklids, tailgates or the like for automotive vehicles. Designing such closure panels often requires that various factors such as cost, weight, strength, aesthetic appearance or the like be taken into account and, in some cases, balanced against each other. As an example, desirable characteristics for liftgates of automotive vehicles such as sport utility vehicles (SUVs), pickup trucks or the like include strength, low weight, low cost, aesthetic appeal or the like. Thus, the present invention seeks to meet these needs by providing an improved panel, which includes one or more of the aforementioned desirable characteristics.

SUMMARY OF THE INVENTION

According to one aspect, the present invention provides a closure panel with an inner panel portion formed of a first material, such as one selected from metal and a polymeric material, and an outer panel portion formed of a second material, such as one selected from metal and a polymeric material. An intermediate material is positioned between the inner panel portion and the outer panel portion. Preferably, the intermediate material is structurally reinforcing or energy absorbing and also preferably substantially contacts both the inner panel portion and the outer panel portion over at least a portion of their respective surfaces for assisting in transmitting loads therebetween.

According to another aspect, the present invention provides a bed of a pickup truck. The bed includes a pair of spaced apart opposing side walls and a liftgate in pivoting relation to the side walls. The liftgate includes an inner panel portion formed of a material selected from metal and a polymeric material and an outer panel portion also formed of a material selected from metal and a polymeric material. The liftgate also includes an intermediate material positioned between the inner panel portion and the outer panel portion.

According to yet another aspect of the present invention, there is provided a method of forming a closure panel. According to one step of the method, a first panel portion and a second panel portion are provided. The first panel portion is attached to the second panel portion at perimeter portions of the panel portions thereby forming a cavity between the panel portions. An intermediate material is placed into the cavity, such as by dispensing a foamable material wherein the intermediate material preferably connects the first panel portion to the second panel portion. Optionally, the closure panel is rotatably attached to an article of manufacture.

DETAILED DESCRIPTION OF THE PREFERRED EMBODIMENT

The present invention is premised upon the formation of a panel for an transportation vehicle or another article of manufacture. When used in an transportation vehicle, it is contemplated that the panel may, for example, be used as a roof, a floor pan or any other panel of the vehicle. It has been found, however, that the panel is particularly suitable for use as a closure panel (e.g., a door or liftgate) for an automotive vehicle or other article of manufacture. Thus, the panel is referred to herein as a closure panel, but it is understood that the panel may be elsewhere employed within the scope of the present invention unless otherwise stated.

The closure panel will typically include one or more of the following:

a first panel portion (e.g., an inner panel portion of a liftgate) that is preferably formed of polymeric material, but which may be formed of other materials such as metal;

a second panel portion (e.g., an outer panel portion of the liftgate) that is preferably formed of a metal (e.g., steel), but which may be formed of other materials such as plastics or other polymeric materials; and an intermediate material (e.g., a structural or rigid foam) positioned between the first and second panel portions for transmitting loads therebetween.

The polymeric materials herein, it will be appreciated, may comprise polymers, copolymers or the like; or they may be part of a blends, composites or the like; or they may be provided in any other suitable form. For example, one type of polymer is part of a filled or reinforced plastic.

Unless specified otherwise, the intermediate material may be rigid, semi-rigid, substantially non-rigid or the like. In one preferred embodiment, the intermediate material is a structural reinforcement material that is preferably rigid or semi-rigid. Alternatively, the intermediate material may be less rigid or substantially non-rigid and may merely absorb energy, transfer energy, dampen sound or the like.

Figure 1:
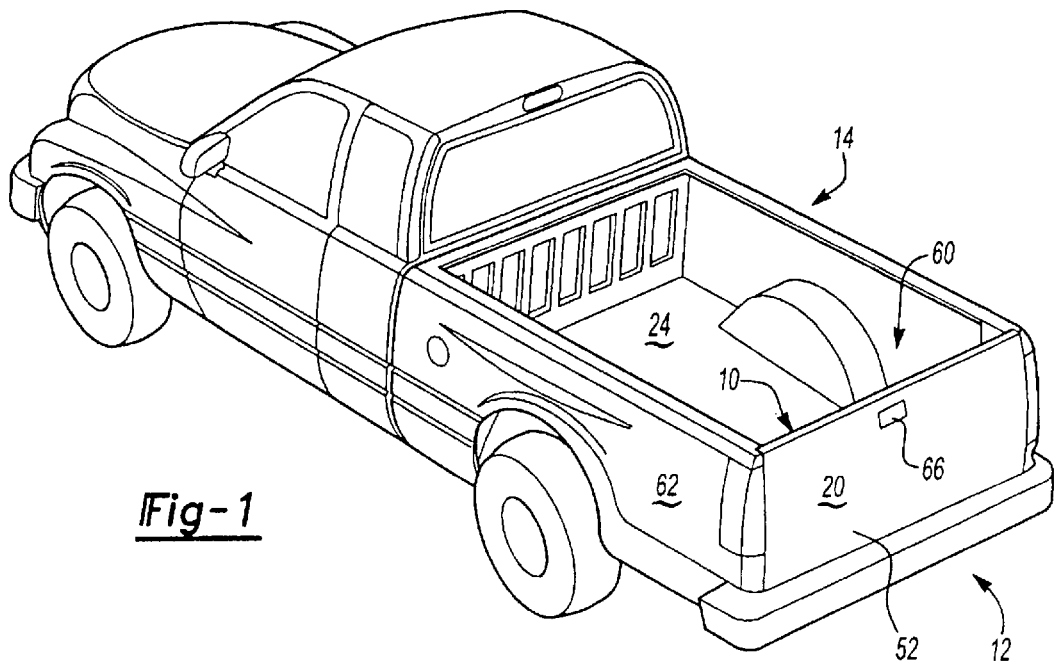
FIG. 1 is a perspective view of a pickup truck having a bed with a liftgate in the closed position.
Figure 2:
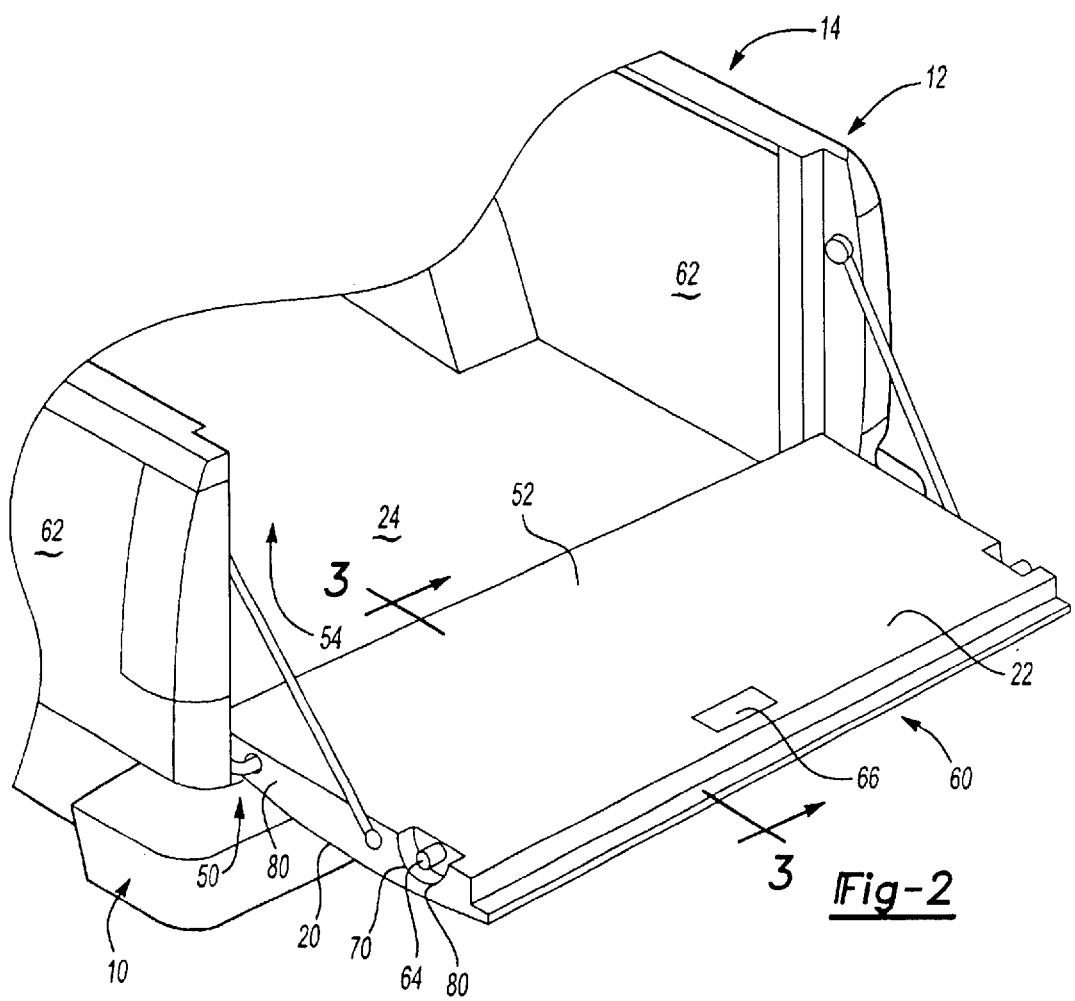
FIG. 2 is a perspective view of a bed of a pickup truck with a liftgate in the open position.
Figure 3:
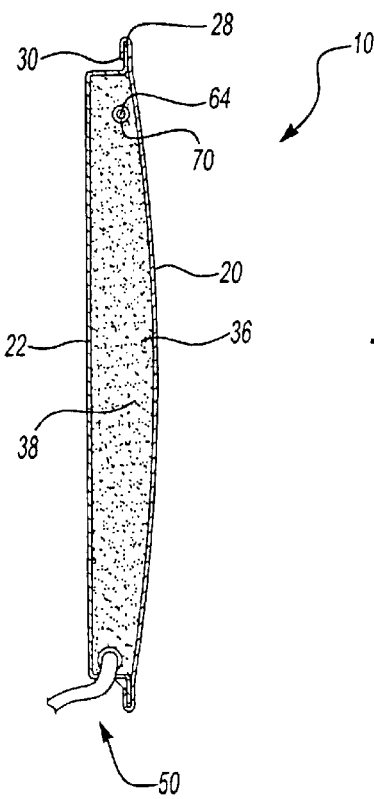
FIG. 3 illustrates a sectional view of the liftgate of the pickup truck taken along line 3—3 of FIG. 2.

Referring to FIGS. 1–3, there is illustrated a preferred exemplary embodiment of a closure panel 10 formed in accordance with the present invention. As illustrated, the closure panel 10 is shown as a liftgate, which forms part of a bed 12 of a pickup truck 14. However, it is contemplated that the closure panel of the present invention may be adapted for use as a closure panel in various portions of an automotive vehicle. As examples, the closure panel may be adapted for use as a hood, a decklid, a door, a rear hatch or the like. Moreover, it is specifically contemplated that the closure panel of the present invention may be adapted for use in articles of manufacture such as buildings, boats, furniture or the like. It has been found that the closure panel of the present invention is particularly useful as a liftgate for pickups and SUVs, however, the invention should not be limited to such unless specifically recited.

As shown, the closure panel 10 includes a first panel portion shown as an outer panel portion 20 that faces outwardly away from the bed 12 of the truck 14 when the closure panel 10 is in a closed position as in FIG. 1. The closure panel 10 also includes a second panel portion shown as an inner panel portion 22 that faces inwardly toward the bed 12 of the truck 14 when the closure panel 10 is in the closed position. The panel portions 20, 22 may be provided in a variety of shapes and configurations. The panel portions 20, 22 may be substantially planar, geometric, arcuate, contoured or the like. They may include ribs or other reinforcing structure, ornamentation, moldings, logos, word or the likes. Preferably, the panel portions 20, 22 substantially oppose each other and are substantially coextensive with each other, however, such is not required. In a highly preferred embodiment, the outer panel portion 20 is generally arcuate while the inner panel portion 22 is contoured or otherwise shaped or unshaped to correspond to (e.g., have a similar aesthetic appearance) to a floor panel 24 of the bed 12 of the truck 14.

The panel portions 20, 22 are preferably formed of materials having relatively high strength to weight ratios. The materials may be metals such as steel, aluminum, iron, magnesium, titanium, combinations thereof or the like. Preferably, however, one or both of the panel portions 20, 22 are formed of polymeric materials (e.g., plastics). Accordingly, in one preferred embodiment, one or both the panels 20, 22 of the present invention preferably is made from a plastic material, and more preferably a thermoplastic and/or thermoset material. In a particularly preferred embodiment, at least one of the panels 20, 22 includes a high strength thermoplastic and/or thermoset resin selected from styrenics, polyamides, polyolefins, polycarbonates, polyesters, polyvinyl esters, mixtures thereof or the like. Still more preferably they are selected from the group consisting of acrylonitrile butadiene styrene, polycarbonate/acrylonitrile/butadiene styrene, polycarbonate, polyphenylene oxide/polystyrene, polybutylene terephthalate, polyphenylene oxide, polyphenylene ether, syndiotactic polystyrene, ethylene alpha olefin, polybutylene terephthalate/polycarbonate, polyamide (e.g., nylon), polyesters, polyurethane, sheet molding compound (SMC) (e.g., polyesters, polyvinyl esters), thermoset polyurethane, polypropylene, polyethylene (e.g., high density polyethylene (HDPE)), and mixtures thereof or the like. It is contemplated that all of the polymeric materials above may be fiber reinforced or otherwise reinforced with ceramic, such as glass or other fibers. According to one preferred embodiment, for reinforcement, the polymeric materials include relatively long glass fibers that are longer than 5 mm, more preferably longer than 1.0 cm and even more preferably longer than 2.5 cm, and even more preferably longer than 4.5 cm. Advantageously, such polymeric materials are lightweight and can assist in lowering the weight of the closure panel 10. It is also contemplated that one or more fillers may be included with the polymeric materials.

It is possible to make one or more of the panel portions 20, 22 using art-disclosed techniques for the fabrication of the material selected. Thus, for example, one or more of the panels may be formed, molded, machined, stamped or otherwise configured to the desired shape. Where the panel portions are plastic, it is possible to use any suitable plastic fabrication technique including, without limitation, injection molding (including but not limited to external or internal gas injection molding), blow molding, compression molding, rotational molding, thermoforming, extruding, vacuum forming, foaming-in-place, or otherwise. Accordingly, as can be appreciated, in one embodiment, hybrid assemblies can be fabricated, thereby taking advantage of the benefits of different respective materials and different respective fabrication techniques. In one embodiment, the first panel portion is a first material, and the second panel portion is a second material that is different from the first material. In another embodiment, the material is the same in both panel portions.

Figure 2A:
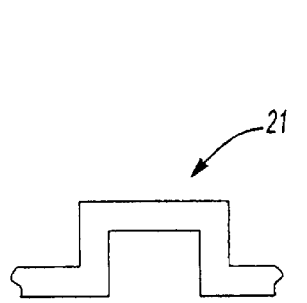
FIG. 2A illustrates an example of an intearated reinforcement structure.

It is contemplated that the panel portions 20, 22 may also be formed to include one or more integrated reinforcement structures. As used herein, the term "integrated reinforcement structure" shall refer to a location where a molded component is joined, enlarged or reduced in wall thickness, section thickness, or otherwise configured to effectively create a beamed structural section for creating a locally modified bending moment or otherwise imparting additional rigidity, toughness or impact resistance to a panel portion. FIG. 2A illustrates an example of an integrated reinforcement structure 21.

As will be appreciated, proper material selection for the panel portions 20, 22 will permit efficient design and molding of optimal wall thicknesses, part section thicknesses or both, for achieving the desired performance without substantially increasing vehicle weight. By way of example, for panel portions of polymeric materials, it is desired for many applications that the maximum wall stock thickness will range up to about 6 mm or higher, more preferably it will range from about 1 mm to about 4.0 mm, and still more preferably, it will range from about 2 mm to about 3 mm. For panel portions of metal materials, it is desired for many applications that the maximum wall stock thicknes will range up to about 3 mm or higher, more preferably it will range from about 0.25 mm to about 2 mm, still more preferably, it will range from about 0.50 mm to about 1.5 mm.

Moreover, it is preferable for the materials of the panel portions 20, 22 to have similar coefficients of thermal expansion relative to each other to assist in maintaining structural integrity of the closure panel 10 once the panel portions 20, 22 are assembled together. Preferably, the higher coefficient is within 400% or higher of the lower coefficient, more preferably within 225% of the lower coefficient, even more preferably within 175% of the lower coefficient and still more more preferably within 70% of the lower coefficient.

With particular reference to FIG. 3, it can be seen that the panel portions 20, 22 are attached to each other at perimeter portions 28, 30. Preferably, the perimeter portions 28, 30 overlap each other such that the panel portions 20, 22 are interferingly attached to each other. In the particular embodiment shown, the perimeter portion 28 of one of the panel portions 20, 22 is arranged in a hem flange configuration for entrapping the perimeter portion 30 of the other panel portion 22, which may seal about a portion or the entirety of the periphery of the panel 10. The perimeter portions 28, 30 may be further attached to each other with fasteners, adhesives or the like, with or without an intermediate spacer structure. Additionally, one or more gaskets or seals may be used to assist in sealing the perimeter portion 28, 30 relative to each other thereby substantially forming a continuous or non-continuous (e.g., partial or intermittent) seal about the outer periphery of the panel 10. In a highly preferred embodiment, the perimeter portions 28, 30 are attached to each other in a manner that forms a substantially liquid tight seal with or without the use of an additional sealing material.

If employed, an adhesive used to join the panel portions 20, 22 may be any suitable adhesive. Preferably it is a urethane based adhesive, and more preferably a urethane adhesive. Alternatively, the adhesive may include a functional component selected from acrylonitrile butadiene styrene (ABS), polycarbonate (PC), or a mixture thereof (e.g. PC-ABS). In a further alternative embodiment the adhesive is a silane adhesive, a silicone adhesive or a mixture thereof. In yet another embodiment, the adhesive is an acrylic adhesive. The adhesive may also be epoxy based. It may include polyolefinics, styrenics, acrylics or mixtures thereof. In yet another embodiment, a preferred adhesive includes alkyl borane. Examples of suitable adhesives are disclosed in commonly owned U.S. Pat. No. 09/466,321 (filed Dec. 17, 1999). Any such adhesive may include suitable performance modifiers including art disclosed tackifiers, elastomers, impact modifiers, beads, fillers, colorants, stabilizers or the like.

In one embodiment, a two part, organoborane/amine complex adhesive or other adhesive is employed for adhesively securing the panel portions 20, 22 together. Advantageously, such an adhesive can adhere to low surface energy surfaces or substrates. As such, the adhesive is preferably capable of bonding to corresponding surfaces having a surface energy of less than 45 mJ/m$^2$.

Adhesives, polymerizable compositions and method of use disclosed in International Patent Application No. PCT/US00/33806, incorporated herein by reference, are especially preferred for use in the present invention to bond the panel portions 20, 22 together.

In addition to, or as an alternative to the use of adhesive to join panels, other suitable joining techniques may be used, such as welding. Examples of suitable welding techniques include art-disclosed techniques of ultrasonic welding, linear vibration welding, orbital vibration welding, spin welding, hot plate welding, laser IRAM protrusion welding, electric current welding combinations thereof of the like. If welding is performed on plastics, preferably the plastics to be joined are related, sharing at least one common repeat unit. For instance, it may be possible to weld polycarbonate acrylonitrile butadiene styrene to acrylonitrile butadiene styrene, polycarbonate acrylonitrile butadiene styrene or possibly polycarbonate. Suitable systems for this type of joinder are available commercially from Branson Ultrasonics Corporation. Examples of such systems are also described, without limitation, in U.S. Pat. Nos. 5,855,706; 5,846,377; and 5,658,408, hereby incorporated by reference.

Typically, substantial regions of the panel portions 20, 22 will be spaced apart from each other to form a cavity 36 therebetween as shown in FIG. 3. The cavity 36 is at least partially filled with an intermediate material 38, which may be continuous or non-continuous. As an example, the intermediate material 38 may be provided as a plurality of separate or joined masses (e.g., strips). In the preferred embodiment, however, the intermediate material 38 substantially entirely fills the cavity 36. The intermediate material 38 may be flexible, but is preferably rigid or semi-rigid.

The intermediate material 38 may be chosen from a variety of different compositions. Preferably, the intermediate material exhibits one more desirable characteristics such as high strength, low weight, high glass transition temperature (e.g., greater than 80° Celsius), energy absorption or the like.

The intermediate material 38 may be applied between the panel portions 20, 22 as a liquid, a semi-solid, a solid, a combination thereof or the like. Moreover, the intermediate material 38 may be applied to the panel portions 20, 22 before or after the panel portions 20, 22 are assembled to each other.

In one preferred embodiment, the intermediate material 38 is dispensed between the panel portions 20, 22 as a liquid (e.g., as two liquid components) and the liquid chemically reacts between the panel portions 20, 22 to form a structural foam. Preferably, the liquid bonds and/or adheres to one or both of the panel portions 20, 22 during formation (e.g., expansion) of the foam. In such an embodiment, it may be preferable to employ one or more tools (e.g., a clamps) for holding the panel portions 20, 22 together against pressure caused by the expansion of the foam.

In one preferred embodiment, the foam is a polyurethane/polyisocyanurate or polyisocyanate foam that is produced by reacting an isocyanate, or isocyanurate with a polyol blend. Suitable isocyanates include methylene diphenyl diisocyanate, polymeric methylene diphenyl diisocyanate, combinations thereof or the like. Preferably, the isocyantes have a functionality of about 2.0 to about 4.0 and more preferably from about 2.4 to about 3.5 and an isocyanate equivalent weight from about 50 to about 200 and more preferably from about 100 to about 160. The polyol blend preferably includes a combination of one or more polyols (e.g. polyether polyols), one or more catalysts (e.g., amine catalysts), one or more surfactants (e.g., silicone surfactants) and water. The isocyanate and the polyol blend are preferably mixed together at a polyol/isocyanate ratio of between about 5:1 or higher and about 0.5:1 or lower, more preferably between about 4:1 and about 1:1, even more preferably between about 3:1 and about 1.5:1, still more preferably about 2.2:1 and about 1.8:1. Preferably, the blend forms a foam with a density from about 0.010 to about 1.0 and more preferably from about 0.032-0.384 g/cc. One exemplary foam material is commercially available under the tradename BETAFOAM® from Dow Chemical Company, Midland, Mich.

In alternative embodiments, it is contemplated that a pre-formed insert (e.g., which may be made of foam or otherwise) may be the intermediate material 38. In such an embodiment, the panel portions 20, 22 are preferably adhered to the intermediate material 38 with an adhesive although not required. Although the adhesive may be applied using numerous techniques, it is contemplated that one adhesive may be an adhesive wrapping that is wrapped about the insert and subsequently heated to activate, foam and adhere to the panel portions 20, 22. In another alternative embodiment, a substantially solid material may be activated to foam and form the intermediate material 38 between the panel portions 20, 22.

The closure panel 10 may be attached to an article of manufacture according to a variety of techniques and using a variety of attachments. Preferably, the closure panel 10 is rotatably attached to its article of manufacture adjacent at least one edge of the panel 10 for allowing the panel 10 to rotate about such edge for opening and closing an opening of the article. In the embodiment illustrated in FIGS. 1–3, the closure panel 10 is connected to the bed 12 (e.g., the floor portion 24) of the truck 14 with one or more fasteners 50 (e.g., trunnion hinges) such that the panel 10 may rotate about its edge 52 for opening and closing an opening 54 to the bed 12 of the truck 14. As shown, the closure panel 10 is pivotable from a substantially vertical orientation in the closed position in FIG. 1 to a substantially horizontal position in the open position in FIG. 2.

As alternatives, the closure panel 10 may be otherwise situated relative to the truck bed 12. For example, the closure panel 10 may be a mid-gate located intermediate the front and back of the bed 12 or intermediate a cab portion of the truck and the bed 12. As another example, the closure panel may be a side gate located along one of the portions 62 of the truck bed 12.

The closure panel 10 is also preferably selectively fastenable to its article of manufacture via a selectively fastenable latching mechanism. In the illustrated embodiment, a latching mechanism 60 is integrated into the panel 10 for fastening the closure panel 10 to portions 62 (e.g., side panels or portions) of the bed 12 of the truck 14. In the embodiment depicted, the latching mechanism 60 includes one or more rods 64 for selectively interferingly engaging the portions 62 of the bed 12 of the truck 14. The latching mechanism 60 also includes one or more handles 66 for actuating the rods 62 for opening and closing the closure panel 10. It is contemplated that a latching mechanism such as the one shown may be installed as a pre-assembled mechanism or as components.

The closure panel may accommodate the attachments (e.g., fasteners, latching mechanisms or the like) in a variety of ways. Either of the panel portions, the intermediate material or both may be formed with openings or cavities for accommodating attachments and the openings or cavities may be between the panel portions or outside of the panel portions. Moreover, the panel portions, the intermediate material or both may include localized reinforcement structures for assisting in accommodating attachments.

Optionally, one or more openings 70 (e.g., passageways, through-holes, cavities or the like) are formed in the intermediate material 38, the panel portions 20, 22 or both of the closure panel 10 for the rods 64 of the latching mechanism 60 to extend through. As shown, the openings 70 allow the rods 64 to extend from adjacent the one or more handles 66 to and through sides of the panel 10.

In a preferred embodiment, both the fasteners 50 and the rods 64 of the latching mechanism 60 are attached to and/or engageable with reinforced areas 80 of one or more of the panel portions 20, 22. Such reinforced areas 80 may be formed by providing additional thickness to the panel portions 20, 22 at the reinforced areas or by providing reinforcements such as metal or plastic panels or reinforcement structures at the reinforced areas.

Figure 4:
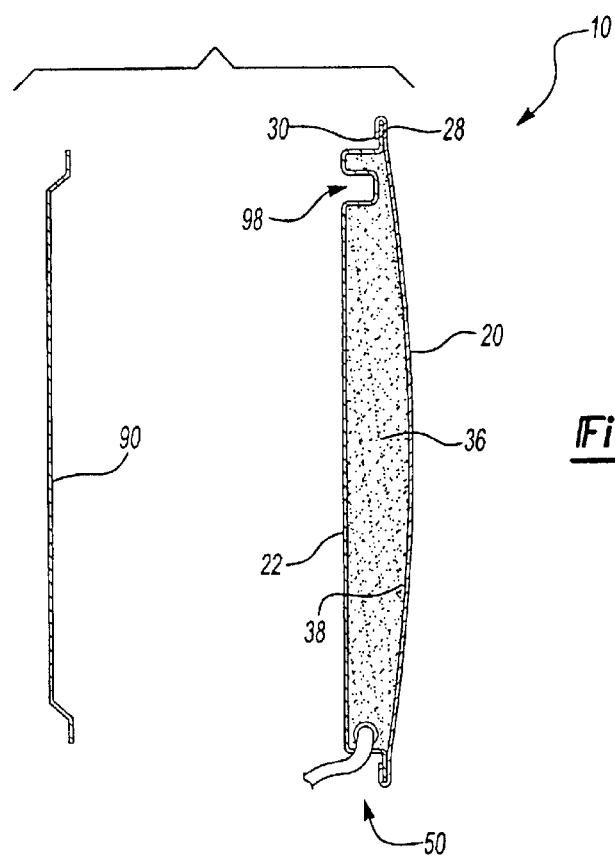
FIG. 4 illustrates a sectional view of an alternative liftgate for the pickup truck of FIGS. 1 and 2.

It is further contemplated that a closure panel according to the present invention may include one or more replaceable protective features. According to one preferred embodiment illustrated in FIG. 4, a replaceable protective panel portion 90 may be attached to the closure panel 10 for overlaying one or more of the panel portions 20, 22. In the preferred embodiment, the protective panel portion 90 is secured to the closure panel 10 in substantially coextensive and overlaying relation to the inner panel portion 22. The protective panel portion 90 may be formed of a variety of materials such as metal or plastic, but is preferably formed of a polymeric material similar to, or the same as one of the materials discussed above in relation to the other panel portions 20, 22 of the closure panel 10. In FIG. 4, the inner panel portion 22 is formed with a cavity 98 for at least partially housing a latching mechanism such as the latching mechanism 60 of FIGS. 1–3. Preferably, such a latching mechanism is at least partially or substantially covered by the protective panel portion 90.

Advantageously, the present invention provide a load floor of substantial strength and low weight. As used herein, the term load floor is any panel oriented within 45 degrees of horizontal and having at least a portion of empty space behind it. For example, panel portion 22 is a load floor when the panel 10 is in the open position as shown in FIG. 2. Also advantageous, certain embodiments of the present invention may provide a closure panel and particularly a liftgate having substantially increased strength relative to previous panels or liftgates. Moreover, some embodiments may also exhibit lower weights.

It is also believed that some closure panels formed in accordance with the present invention can be load tested and exhibit substantially improved deflection results. In one embodiment, a liftgate according to the present invention is subjected to a load of 225 kilograms and deflects only 2.3 mm, which are exhibited by previous liftgates. In another embodiment, a liftgate is subjected to a load of 450 kilograms and deflects only 2.5 mm. Of course, such strength will depend upon the materials used for the panel portions 20, 22 and the intermediate material 38. Thus, it is clearly contemplated that closure panels and liftgates that are both stronger and weaker than the examples above may be formed within the scope of the present invention. Moreover, there is no strength or weight requirement for the closure panel or liftgate of the present invention unless such a requirement is specifically recited.

As an additional advantage for embodiments such as those illustrated in FIGS. 1–4, loads that are placed upon the inner panel portion 22 are at least partially transmitted to the outer panel portion 20 through the intermediate material 38 such that the outer panel portion 20 may be more effectively used to resist such loads. More particularly, for certain embodiments of the present invention, the intermediate material 38 tends to transmit loads from the inner panel portion 22 or from elsewhere to the outer panel portion 20 such that the loads place tensile stresses upon the outer panel portion 20. Thus, materials such as metals, which can endure greater tensile stresses may be more effectively used for the outer panel portion 20.

The foregoing discussion discloses and describes merely exemplary embodiments of the present invention. One skilled in the art will readily recognize from such discussion and from the accompanying drawings and claims, that various changes, modifications and variations can be made therein without departing from the spirit and scope of the invention as defined in the following claims. In particular regard to the various functions performed by the above described components, assemblies, devices, compositions, etc., the terms used to describe such items are intended to correspond, unless otherwise indicated, to any item that performs the specified function of the described item, even though not necessarily structurally equivalent to the disclosed structure. In addition, while a particular feature of the invention may have been described above with respect to only one of the embodiments, such feature may be combined with one or more other features of other illustrated embodiments.

What is claimed is:

1. A liftgate for an automotive vehicle, comprising:
    (a) an inner panel portion formed of a material selected from metal and a polymeric material, the inner panel portion having an outer perimeter portion;
    (b) an outer panel portion formed of a material selected from metal and a polymeric material, the outer panel portion having an outer perimeter portion wherein the outer perimeter portion of the outer panel portion is attached to the outer perimeter portion of the inner panel portion; and
    (c) a polymeric intermediate material positioned between the inner panel portion and the outer panel portion, the polymeric intermediate material substantially contacting both the inner panel portion and the outer panel portion for transmitting loads therebetween, wherein the intermediate material is a rigid structural reinforcement foam that extends to adjacent the perimeter portions;

wherein the liftgate is pivotable relative to the automotive vehicle from a substantially vertical orientation in a closed position to a substantially horizontal position in an open position and wherein the automotive vehicle is selected from a pickup truck or an SUV.

2. A liftgate as in claim 1 wherein the inner panel portion is formed of a polymeric material and the outer panel portion is formed of a metal.

3. A liftgate as in claim 2 wherein the polymeric material includes a polymer selected from the group consisting of polyester, polystyrene, polyamide, polyurethane and polypropylene.

4. A liftgate as in claim 3 wherein the polymeric material of the inner panel portion includes glass reinforcement fibers having an average length greater than 2 centimeters.

5. A liftgate as in claim 2 wherein the outer panel portion is formed of steel.

6. A liftgate as in claim 1 further comprising a replaceable protective panel portion overlaying the inner panel portion.

7. A liftgate as in claim 1 wherein the intermediate material is formed from a polyisocyanate.

8. A liftgate as in claim 1 wherein the inner panel portion is at least partially attached to the outer panel portion with a hem flange at respective perimeter portions of the inner and outer panel portions.

9. A liftgate as in claim 1 wherein the polymeric intermediate material is a polyurethane foam that is adhered to the inner panel portion and the outer panel portion.

10. A liftgate as in claim 1 wherein the outer panel portion is substantially arcuate.

11. A liftgate as in claim 1, further comprising a latching mechanism, the latching mechanism including a centrally located handle and at least one rod extending from the handle to a side of the liftgate.

12. A bed of a pickup truck, the bed comprising:
a pair of spaced apart opposing side walls; and
a liftgate in pivoting relation to the side wall, the liftgate including;
(a) an inner panel portion formed of a material selected from metal and a polymeric material;
(b) an outer panel portion formed of a material selected from metal and a polymeric material; and
(c) a polymeric intermediate material positioned between the inner panel portion and the outer panel portion;
wherein the intermediate material is a reinforcing foam.

13. A bed of a pickup truck as in claim 12 wherein the outer panel portion is formed of steel.

14. A bed of a pickup truck as in claim 12 further comprising a replaceable protective panel portion overlaying the inner panel portion.

15. A bed of a pickup truck as in claim 12 wherein the intermediate material is formed from a polyisocyanate.

16. A bed of a pickup truck as in claim 12 wherein the inner panel portion is at least partially attached to the outer panel portion with a hem flange at respective perimeter portions of the inner and outer panel portions.

17. A bed of a pickup truck as in claim 12 wherein the polymeric intermediate material is a polyurethane foam that is adhered to the inner panel portion and the outer panel portion.

18. A bed of a pickup truck as in claim 12 wherein the outer panel portion is substantially arcuate.

19. A bed of a pickup truck as in claim 12, further comprising a latching mechanism, the latching mechanism including a centrally located handle and at least one rod extending from the handle to a side of the closure panel.

20. A liftgate as in claim 9 wherein the inner panel portion and the outer panel portion form a cavity therebetween and the intermediate material is a polyurethane foam that substantially entirely fills the cavity.

21. A bed of a pickup truck as in claim 17 wherein the inner panel portion and the outer panel portion form a cavity therebetween and the intermediate material is a polyurethane foam that substantially entirely fills the cavity.

22. A bed of a pickup truck as in claim 21 wherein the liftgate is pivotable relative to the pickup truck from a substantially vertical orientation in a closed position to a substantially horizontal position in an open position.

23. A bed of a pickup truck, the bed comprising:
a pair of spaced apart opposing side walls; and
a liftgate in pivoting relation to the side wall, the liftgate including;
(a) an inner panel portion formed of a material selected from metal and a polymeric material;
(b) an outer panel portion formed of a material selected from metal and a polymeric material; and
(c) a polymeric intermediate material positioned between the inner panel portion and the outer panel portion
wherein the inner panel portion is formed of a polymeric material and the outer panel portion is formed of a metal;
wherein the polymeric material of the inner panel portion includes a polymer selected from the group consisting of polystyrene, polyamide, polyurethane and polypropylene; and
wherein the polymeric material of the inner panel portion includes glass reinforcement fibers having an average length greater than 2 centimeters.

24. A bed of a pickup truck as in claim 23 wherein the intermediate material is a reinforcing foam.

25. A liftgate for an automotive vehicle, comprising:
(a) an inner panel portion formed of a material selected from metal and a polymeric material, the inner panel portion formed of a polymeric material;
(b) an outer panel portion formed of a material selected from metal and a polymeric material, the outer panel portion formed of a metal; and
(c) a polymeric intermediate material positioned between the inner panel portion and the outer panel portion, the polymeric intermediate material substantially contacting both the inner panel portion and the outer panel portion for transmitting loads therebetween, the intermediate material being a structural reinforcing foam;
wherein the closure panel is pivotable relative to the automotive vehicle from a substantially vertical orientation in a closed position to a substantially horizontal position in an open position and wherein the automotive vehicle is selected from an pickup truck or an SUV.

26. A liftgate as in claim 25 wherein the intermediate material is rigid or semi-rigid.

27. A liftgate as in claim 26 wherein the density of the intermediate material is between 0.032 g/cm$^3$ and 0.384 g/cm$^3$.

28. A liftgate as in claim 27 wherein the inner panel portion having an outer perimeter portion, the outer panel portion having an outer perimeter portion wherein the outer perimeter portion of the outer panel portion is attached to the outer perimeter portion of the inner panel portion and wherein the perimeter portion of either the inner panel portion or the outer panel portion is configured for entrapping the perimeter portion of the other of the inner panel portion or the outer panel portion.

29. A liftgate as in claim 28 wherein substantial regions of the inner panel portion and outer panel portion are spaced apart from each other for forming the cavity.

30. A liftgate as in claim 29 wherein the perimeter portions of the inner panel portion and the outer panel portion are attached to each by forming a hem flange.

31. A liftgate as in claim 25 wherein inner panel includes an integrated reinforcement structure that creates a beamed structural section for creating a locally modified bending moment.

32. A liftgate as in claim 25 wherein a coefficient of thermal expansion of the inner panel portion is within 175% of a coefficient of thermal expansion of the outer panel portion.

33. A liftgate as in claim 25 wherein the liftgate deflects less than 2.3 mm with a load of 225 Kg.

34. A liftgate as in claim 1 wherein the foam extends to perimeter portion about substantially the entirety of the panel portions.

35. A bed of a pickup truck as in claim 12 wherein the inner panel portion includes an integrated reinforcement structure that creates a beamed structural section for creating a locally modified bending moment.

36. A bed of a pickup truck as in claim 12 wherein a coefficient of thermal expansion of the inner panel portion is within 175% of a coefficient of thermal expansion of the outer panel portion.

37. A bed of a pickup truck as in claim 12 wherein the liftgate deflects less than 2.3 mm with a load of 225 Kg.

* * * * *